Patented May 9, 1933

1,908,473

UNITED STATES PATENT OFFICE

THOMAS R. CUNNINGHAM, OF FLUSHING, NEW YORK, AND ROBERT C. PRICE, OF CLEVELAND, OHIO, ASSIGNORS TO KEMET LABORATORIES COMPANY, INC., A CORPORATION OF NEW YORK

SEPARATION OF TANTALUM FROM COLUMBIUM

No Drawing.     Application filed May 9, 1931.  Serial No. 536,319.

The invention relates to the treatment of ores, alloys and compounds containing tantalum and columbium which may contain other elements that are commonly associated with these elements in nature, such as iron, manganese and titanium. One of the objects of the invention is to provide methods for producing pure tantalum and columbium oxides. Another object of the invention is to provide methods for separating tantalum compounds from columbium compounds when they are associated with each other. Another object of the invention is to provide economical methods for treating a compound of tantalum and columbium which contains impurities, eliminating the impurities, and recovering all of the tantalum and all of the columbium, the columbium and tantalum being uncontaminated with each other.

The refractory characteristics of tantalum and columbium, the insolubility of their compounds, and their property of forming absorbent gelatinous or colloidal acids has made the separation of these elements from each other or from other elements extremely difficult and costly by the methods heretofore proposed. As far as we are aware the separation of pure tantalum by these methods involves the loss of large amounts of tantalum which remain with the columbium. In like manner the production of pure columbium involves the loss of large amounts of columbium.

According to the invention a mixture of the acids of columbium and tantalum which is free from other heavy metals or from all but small fractional percentages of such metals is freed from other anions, the resulting substance is converted into a solution of alkali metal columbates and tantalates, and in this solution the tantalum and columbium are completely separated from each other by introducing bicarbonate into the solution and regulating the temperature of the solution.

The production of tantalum oxide and columbium oxide from an ore which contains silicon, iron, manganese and titanium as its principal impurities will now be described as an illustration of one embodiment of the invention. A dry ore which contained about 9% tantalum oxide and 65% columbium oxide was crushed and passed through a No. 100 mesh standard sieve. Ten parts of the crushed ore was mixed with one part of powdered charcoal. The mixture was heated to about 900° to 1000° C. and chlorine, bubbled through carbon tetrachloride at ordinary temperatures, or warmed to 35° to 40° C., was passed over the mixture to convert the tantalum, the columbium and some of the impurities to chlorides. The chlorides were then volatilized and were conducted away by the excess of chlorine and deposited by sublimation in a cooled chamber. The dry sublimate consisted of tantalum and columbium chlorides contaminated with iron, manganese and titanium chlorides.

The mixture of dry chlorides was added directly to an excess of a hot, dilute solution of hydrochloric acid containing about 3% of hydrochloric acid. The chlorides were kept in an atmosphere of chlorine until dissolved. This is preferable for the reason that they suffer changes from contact with air and become unfitted for the production of the purest products. The tantalum and columbium were converted by this treatment into the corresponding insoluble acids and the bulk of the impurities was converted into soluble chlorides. The acids were separated from the soluble portions by filtration and washed. The columbic and tantalic acids were heated to 600° to 900° C. to eliminate other anions such as chlorides, sulphates and the like, being converted to oxides by this treatment.

The resulting mixture of tantalic and columbic oxides freed from foreign anions was added to about 3 parts by weight of fused potassium hydroxide and heated until the oxides were converted to potassium hexatantalate and hexacolumbate. The cooled fusion was dissolved in about 7 parts by weight of water per part of oxide. This solution sometimes contained a small amount of precipitate which consisted mainly of a residue of iron and titanium and which was separated from the solution.

The clear water solution which contained about 250 grams per liter of potassium hexatantalate and potassium hexacolumbate was brought to and maintained at a temperature of 20° to 25° C. and the tantalum was precipitated by bubbling carbon dioxide into the solution until the solution was saturated thereby forming a bicarbonate in solution. The precipitate was found to consist entirely of tantalic acid salts, probably the potassium acid tantalate, which settled rapidly. This precipitate was immediately separated from the solution. No tantalum was present in the filtrate. Pure tantalic oxide was then produced by treating the precipitated acid salt of tantalum with dilute hydrochloric acid or sulphuric acid, digesting, filtering and igniting the precipitate.

The solution which contained alkali metal columbate was acidified with sulphuric acid. The solution was diluted by adding three times its volume of boiling water. Pure columbic acid precipitated. It was washed by decantation and filtered. The columbic acid was converted to the oxide by ignition.

We have found that it is essential to exclude foreign anion impurities from the alkali metal columbate-tantalate solution. The foreign anions are preferably excluded by ignition at temperatures above 600° C. before the acids are converted to the soluble alkali metal compounds, but any suitable method of excluding foreign anions can be employed. The proportions of mixed oxides, potassium hydroxide and water are of utmost importance in order to eliminate traces of metal impurities and to precipitate tantalum to the exclusion of columbium. One part of the mixed oxides to about 3 to 4 parts by weight of potassium hydroxide to about 6 to 8 parts by weight of water have given the results described.

It is important to regulate the temperature of the alkali metal tantalate-columbate solution when the tantalic acid salt is precipitated. We have found that temperatures between 15° and 30° C. will give the desired separation.

It is to be understood that various methods of producing the mixed acids or oxides of tantalum and columbium may be used. One method consists in fusing the powdered alloy, ore or impure compound with sodium bisulphate, heating the fusion mixture to about 600° to 650° C. until practically all of the sulphuric acid is driven off, and leaching the cooled fusion with water. The precipitate is filtered off and washed with dilute acid giving a tantalic-columbic acid which contains only small amounts of impurities.

It is to be understood that the tantalic-columbic acid shall be brought into solution as the potassium salts and that this solution shall be free of foreign anions.

We claim:—

1. The method of separating tantalum from compounds containing tantalum and columbium which comprises bringing the tantalum and columbium into solution as potassium hexatantalate and hexacolumbate, saturating the solution with carbon dioxide, and separating the precipitated tantalum compound, said solution containing the equivalent of 1 part by weight of oxides of columbium and tantalum, about 3 to 4 parts by weight of potassium hydroxide and about 6 to 8 parts by weight of water, the temperature of said solution being about 15° C. to 30° C.

2. The method of separating tantalum from compounds containing tantalum and columbium which comprises bringing the tantalum and columbium into solution as potassium hexatantalate and hexacolumbate, saturating the solution with carbon dioxide, and separating the precipitated tantalum compound, said solution containing the equivalent of 1 part by weight of oxides of columbium and tantalum, about 3 parts by weight of potassium hydroxide and about 7 parts by weight of water, the temperature of said solution being about 20° C.

3. The method of separating tantalum from compounds containing tantalum and columbium which comprises converting the tantalum and columbium into tantalic and columbic acids, separating other anions from said acids, converting the acids into a solution containing potassium hexatantalate and hexacolumbate, introducing potassium bicarbonate into the solution, and separating the precipitated tantalic acid salt.

4. The method of separating tantalum from compounds containing tantalum and columbium which comprises converting the tantalum and columbium into a solution of potassium hexatantalate and hexacolumbate, and introducing potassium bicarbonate into the solution to precipitate the tantalic acid salt.

5. The method of separating tantalum from compounds containing tantalum and columbium which comprises converting the tantalum and columbium into a solution of potassium hexatantalate and hexacolumbate, and introducing potassium bicarbonate into the solution to precipitate the tantalic acid salt, said solution containing the equivalent of 1 part by weight of oxides of tantalum and columbium, about 3 to 4 parts by weight of potassium hydroxide, and about 6 to 8 parts by weight of water, the temperature of said solution being about 15° C. to 30° C.

6. The method of separating tantalum from compounds containing tantalum and columbium which comprises fusing the compound with sodium bisulphate at about 600° to 650° C., leaching with water, separating the insoluble acids, separating other anions from said acids, bringing the acids into solution as potassium salts, introducing potassium bicarbonate into the solution, and separating the tantalic acid salt.

7. The method of separating tantalum from compounds containing tantalum and columbium which comprises converting the tantalum and columbium into a solution of potassium hexatantalate and potassium hexacolumbate, and precipitating the tantalic acid salt in the presence of a bicarbonate.

In testimony whereof, we affix our signatures.

THOMAS R. CUNNINGHAM.
ROBERT C. PRICE.